United States Patent [19]

Short

[11] Patent Number: 5,271,999
[45] Date of Patent: Dec. 21, 1993

[54] DUCT TAPE HAVING A NON-DEPOSITING ADHESIVE

[75] Inventor: Clifford R. Short, Irmo, S.C.
[73] Assignee: Anchor Continental, Columbia, S.C.
[21] Appl. No.: 977,082
[22] Filed: Nov. 16, 1992
[51] Int. Cl.$^5$ ............................ B32B 7/00; B32B 7/12
[52] U.S. Cl. .................................... 428/265; 428/261; 428/343; 428/355; 524/483; 523/122
[58] Field of Search ................ 428/355, 343, 261, 265

[56] References Cited

U.S. PATENT DOCUMENTS

| | | | |
|---|---|---|---|
| 4,699,941 | 10/1987 | Salerno | 524/100 |
| 4,740,416 | 4/1988 | De Coste . | |
| 4,891,391 | 1/1990 | McEntee | 428/907 |
| 4,997,709 | 3/1991 | Huddleston et al. | 428/355 |
| 5,093,406 | 3/1992 | Lossner et al. | 428/355 |
| 5,108,815 | 4/1992 | Adams . | |
| 5,112,889 | 5/1992 | Miller et al. | 428/516 |
| 5,143,968 | 9/1992 | Diehl et al. | 428/355 |

OTHER PUBLICATIONS

Handbook of Pressure Sensitive Adhesive Technology Edited by Don Satas, 1982 Van Nostrand Reinhold Co. pp. 264-266.

*Primary Examiner*—George F. Lesmes
*Assistant Examiner*—Blaine Copenheaver
*Attorney, Agent, or Firm*—F. Rhett Brockington

[57] ABSTRACT

A duct tape having a non-depositing pressure sensitive adhesive, wherein said duct tape can be removed after application to a surface of a substrate, the duration of the application being indefinitely extended for multiple weeks, without leaving an adhesive residue on the surface of the substrate, where the non-depositing adhesive is a hot melt adhesive based on a SIS Styrenic Block Copolymer rubber having around 40% diblock, that is tackified with an aromatic C-5 resin, and wherein said adhesive has an excellent antioxidant system.

8 Claims, No Drawings

DUCT TAPE HAVING A NON-DEPOSITING ADHESIVE

BACKGROUND

The invention relates generally to duct tapes and more particularly to duct tapes which have an adhesive which does not leave an adhesive residue upon removal.

Duct tape is routinely employed by musicians and stage technicians to affix cables, wires lights, and other appliances usually in anticipation that the attachment is temporary, and will have to be removed or repositioned in the future, where the duration of attachment can vary from a few hours to years. Duct tape is the preferred type of pressure sensitive tape because it is relatively inexpensive, it has a tensile on the order of several pounds per inch, and yet in contrast to filament reinforced or filmic tapes which have to be cut, duct tape has a cloth backing, usually a scrim, that can be easily torn by hand. Duct tape is configured such that the adhesive is of sufficient mass and tack that it adheres well to most surfaces, including vinyl flooring, carpeting, concrete, wood, brick, metal, polymeric veneers, glass and polyolefins such as pvc and polyethylene. In order to stick to these wide variety of substrates, the adhesive is usually based on natural rubber that is tackified to a point where it is quite soft. The preferred process for coating is calendering, because a substantially heavy coat weight has to be applied to coat over the relatively coarse cloth. Also, many of the substrates, such as concrete and carpeting, have rough surfaces that require a lot of adhesive to affect good adhesion. The cloth is usually a scrim, that is frequently laminated to a thin inexpensive film of low density polyethylene. A common problem associated with duct tape is that upon removal it leaves an adhesive residue, which depending on the substrate is usually difficult, at best, to clean. Very often the residue problem is exacerbated along the interfacial edge of the tape and the underlying substrate, as a consequence of oxidation of the adhesive. The instant invention is an article of manufacture and a process for making the same, wherein the article is a type of duct tape with a very aggressive, yet non-depositing adhesive, wherein the adhesive has excellent cohesion as well as adhesion, and the process for making the duct tape is one wherein the adhesive is coated as a 100% solids extruded molten material.

The prior art on duct tape is largely devoted to discussion on various methods to lower cost, while still maintaining performance. Two examples of this are Adams U.S. Pat. No. 5,108,815 wherein the backing is embossed in order to lower density, and DeCoste U.S. Pat. No. 4,740,416 wherein microspheres are dispersed in a polymeric matrix layer in order to achieve a lower density.

Don Satas in the *Handbook Of Pressure-Sensitive Adhesive Technology* discusses duct tapes briefly, and suggests that a duct tape could be prepared using a hot melt extrusion coating process. An adhesive formula, based on the rubber Kraton D-1107, which is a Shell Chemical Company tradename for a block copolymer rubber based on styrene and isoprene, is recited as potential formulation.

The prior art literature largely does not address the topic of duct tapes that do not leave an adhesive residue upon removal, probably because many applications for which duct tape are intended are substantially permanent.

SUMMARY OF THE INVENTION

The invention is a non-depositing duct tape, wherein duct tape is defined as a pressure sensitive tape having a cloth backing and a pressure sensitive adhesive. The cloth backing is usually coated with a polymeric material such as pvc, or laminated to a polymeric film such as polyethylene. In the latter case, the cloth backing is usually an open weave scrim, which is chosen to meet a tensile and tear criteria, and still remain relatively inexpensive. The polyethylene film is usually silver colored, although the film can be any color or combination of colors, such as camouflage duct tape, which has at least three different colors.

The essence of the invention is a novel adhesive that does not leave, upon removal of the tape, a residue of adhesive on the substrate to which the duct tape has been adhered, even when the tape has been in contact with the substrate for days.

A first object of the invention is that the duct tape have an adhesive that can be applied at 100% solids, using a process means that forms a non-bubbled continuous adhesive layer on a cloth backing, wherein the adhesive is bonded to the cloth backing such that the adhesive will not transfer or pick off the backing upon removal of the tape.

The adhesive is formulated such that when the process means is hot melt extrusion, the adhesive is sufficiently low in viscosity to penetrate into the cloth backing, forming an excellent bond. Additionally, the adhesive is formulated such that when the process means is hot melt extrusion, the sufficiently penetrating low viscosity is obtained at a temperature wherein there is minimal thermal degradation of the processed adhesive, and the temperature is low enough that the extruded hot adhesive does not damage a filmic low density polyethylene laminated to the cloth backing.

Additionally, the adhesive is formulated such that it remains very rubbery and does not have a "resinify" feel or "dry" finger tack which are terms invoked in the tape industry used to describe adhesives that are loaded with so much tackifying resin that the pressure sensitive adhesive becomes more plastic and less elastic. Adhesives, wherein the weight percent resin is significantly higher than the weight percent rubber, frequently have these deleterious finger tack terms attributed to them. Hot melt extruded adhesives are frequently heavily loaded with resins in order to lower their processing viscosities, because the molecular weight of resins is much lower than the rubber. Pressure sensitive adhesives that have "dry" finger tack are generally perceived by customers as being inferior, and often the wetting characteristics of these adhesive is poorer on a variety of substrates.

A second object of the invention is that the duct tape have an adhesive that can be applied at 100% solids, using a process means that forms a non-bubbled continuous adhesive layer on a cloth backing, wherein the adhesive has sufficient cohesion such that the adhesive will not split, leaving a residue, upon removal of the tape.

Pressure sensitive adhesive tapes used in masking and protective applications that do not leave a residue upon removal usually are prepared from a solvent or water borne adhesive coating that is cured during the drying operation. A solvent or water borne coating is impractical for cloth backed tapes, which require high coat weights, because the drying process would be prohibitively slow. Generally speaking a cured adhesive has higher cohesion than an uncured adhesive. Curing reduces adhesive residue. Duct tapes, made using a calendered adhesive admixed with various curing additives, accelerators and cross-linking compounds, have been produced, however, producing cured adhesives is largely considered impractical on a calender. The art of achieving a homogeneous mix of the reactive additives within the adhesive, while maintaining a desirable coating viscosity is complicated by the fact that the molecular weight of the rubber, and therefore the viscosity of the adhesive, builds as the cure progresses. The adhesive of the instant invention employs a rubber, which at temperatures below 93° C., performs as if it were cured, however above 121° C. acts like it is not cured. The rubber in the adhesive is a block copolymer of styrene and isoprene which is a blend of di and tri block copolymers, wherein at least 30% of the blend is diblock, and wherein at least 80% of the copolymer is based on the isoprene monomer. Block copolymers are theorized to function like two distinct materials, wherein the mid-block of polyisoprene is a rubber, and the end-block of polystyrene is a crystalline reinforcing region. At below about 93° C., the polystyrenic regions on one polymer chain affiliate, networking through a domain of common crystallinity, with other polystyrenic regions of one or more polymer chains having similar regions. In these domains of common crystallinity, the polystyrene regions associate forming chain-linkages, which impart an instrinsic cure to the block copolymer system, and hence the rubber portion acts like it is cured. An elegant feature of this block copolymer system, that makes it well suited for processing as a hot melt, is that at 93 C., which is the glass transition temperature of polystyrene, the crystalline domains begin to soften. At temperatures above 121 C. the whole polymer is sufficiently softened to be handled as a thermoplastic.

It has been determined that the adhesive has sufficient cohesive strength not to leave residue only when there are less than 100 parts of a tackifying resin per 100 parts of rubber, when there are more than 20 phr of a napthenic oil. Oil is included in most hot melt pressure sensitive formulations at maximum load in order to keep the cost down. The plasticizing effect of oil also improves wetting to where the hot melt adhesive is comparable to a calendered adhesive. At levels significantly above 25 parts per hundred rubber, the rubber starts becoming borderline too soft. The combined total phr of the tackifying resin and the oil should not exceed 130 phr. Higher levels of tackifying resin elevate the adhesion to multiple substrates to a point where adhesion exceeds cohesion. This is particularly true wherein the tackifying resin has a low Ring and Ball melting point, where low is defined as less than 75 C. (167 F.).

A third object of this invention is that the duct tape will function at temperatures as high as 66 C. (150 F.). In many of the anticipated applications, such as securing lights, or affixing cabling on a stage, either the appliance itself or sun rays can raise the temperature of the surface of the substrate in excess of 49 (120 F.). The instant invention is formulated with resins that have a softening point sufficiently high enough such that the adhesive functions up to 66 C. (150 F.). The preferred softening point of the resin should be 88 C. (190 F.) or higher.

A fourth object of the invention is that the duct tape have an adhesive that can be applied at 100% solids, using a process means that forms a non-bubbled continuous adhesive layer on a cloth backing, wherein the adhesive has an antioxidant system that reduces degradation of the adhesive affected by the hot melt extrusion process, while at the same time does not cause gelation. Typically during the coating operation, the adhesive is held in a carbon dioxide blanketed tank at 177 C. (350 F.). While in the tank significant degradation can take place, as evidenced by a drop in the viscosity. The viscosity drops as a consequence of chain scission of the polyisoprene mid-block. Chain scission results in an adhesive having lower shear and lower cohesion, and is therefore more likely to leave residue upon removal. We have found that degradation needs to be kept to under 12%, as measured by a drop in viscosity, and preferably below 7% degradation. Hindered phenols alone, such as Ciba Geigi's Irganox 1076, which is octadecyl 3,5-di-tert-butyl-4-hydroxyhydrocinnamate, typically produce degradation of 25% or higher under similar circumstances. In addition to limiting processing degradation, the antioxidant system of the instant duct tape adhesive must have excellent stability toward oxidation of the tape edge adhesive, as this too will result in deposition. We have found a synergistic blend of a high boiling hindered phenol, a metal salt of dialkyldithiocarbamic acid and a filler, which is the metal salt of a carbonic acid, that produces excellent stability in the coating process as well as in the aging characteristics of the tape.

A fifth object of the invention is that the duct tape adhesive properties remain relatively unaffected when the adhesive is coated onto a cloth backing that is impregnated with pvc or a plasticized pvc. A preferred type of duct tape used by gaffers and other stage technicians is a flat colored, pressure sensitive adhesive cloth tape, where the cloth is saturated with a plasticized pigmented pvc coating. Components of the saturated cloth, most notably the plasticizer in the pvc, are known to have a propensity to migrate into the adhesive layer, therein making it very soft and prone to deposition. Calendered adhesives, which are usually soft to begin with, often are plasticized to a point where they become glutinous. In the instant invention the adhesive, as evidenced by its implacable characteristics, by inference has a relatively low affinity for pvc plasticizers, as the adhesive remains substantially inviolate to their intrusion.

A sixth object of the invention is that the adhesive can be applied as a 100% solids coating, using a process means that forms a non-bubbled continuous adhesive layer on a cloth backing, wherein the process means is hot melt extrusion coating. In hot melt extrusion coating, the adhesive is applied as a molten material, continuously extruded through a die, onto a web of cloth backing, which is continuously traversing over a supporting nipping backup roller which is in line with the die. The die is a longitudinal slot that is deckled to a width that is just slightly narrower than the width of the backing. The coating profile is established by controlling the mass weight flow rate of the molten adhesive with respect to the speed of the web of a given width, such that for a given web speed there is delivered an appropriate flow of adhesive through the breadth of the die, which results in a filmic mass weight of adhesive being coated onto the cloth backing side of the duct tape backing.

DESCRIPTION OF THE PREFERRED EMBODIMENTS

The pressure sensitive adhesive is comprised of a base rubber that is an elastomer of a styrenic block copolymer consisting substantially of the monomers of styrene and isoprene. The term block refers to the structural arrangement of the components of the linear copolymer, in that there are blocks that consist of polyisoprene and there are blocks that consists of polystyrene. The elastomer in the instant invention is a blend of di and tri block copolymers, wherein 30% or more of the composition of the elastomer is a diblock consisting of a block of styrene bonded to a block of isoprene, and the balance is a triblock consisting of an end-block of styrene bonded to a mid-block of isoprene, which is bonded on the other end of the chain to another end-block of polystyrene. The preferred blend is 42% diblock and 58% triblock. Modulus of the elastomer increases as the weight percent styrene increases, and decreases as the molecular weight decreases. Generally speaking, the more triblock the higher the molecular weight, and the higher the viscosity. Alternatively, the more diblock the lower the viscosity, and for a given temperature, there will be a higher melt flow index. The melt flow index is an important characteristic in hot melt extrusion processing, because higher temperatures, or higher pressures are required to push the molten material through the die. Higher temperatures can result in more polymer degradation during processing, which results in lower cohesive strength, and consequently adhesive residue. At process temperatures above 177 C. (350 F.), a heavy coating of an adhesive can damage a duct tape backing having a very open scrim laminated to a thin film of low density polyethylene, which is usually the construction of general purpose duct tapes. The selection of the polymer (as to percentage di and tri block) within a given polymer group having a comparable composition can have a considerable impact on the process conditions and the probable level of degradation. By way of illustration, KRATON D-1107, which is an SIS block copolymer (Styrene Isoprene Styrene) having 18% diblock copolymer, 72% triblock copolymer comprised of 14% styrene, has a melt flow index of 10 (MFR, dg/min. Cond. G:200 C./5 Kg). In contrast, KRATON D-1112, which is an SIS block copolymer having a much higher percentage diblock. 40% diblock copolymer and the same percent styrene, 14% styrene, has a melt flow index of 25, and the latter can be extruded under more gentle conditions. Therefore, much higher flow rates are achieved at the same temperature and pressure, as the diblock percent increases. Another advantage of formulating the adhesive with a styrenic block copolymer rubber having a significant percentage of diblock, versus formulating with a rubber having very little diblock, is that if and when degradation of the elastomer does occur (and it will occur), resulting in chain scission of the polyisoprene mid-block, the impact on cohesive will be less dramatic, because the scission will represent a smaller percentage change in average molecular weight in the total formulation, and the adhesive will be more tolerant of some degradation. In other words, the instant invention is formulated such that the selection of the rubber enhances processability, and performance stability toward degradation during processing and in application as a duct tape adhesive.

The styrene content of the block copolymer is between 13 and 19 percent, with the preferred styrene content being around 15 percent. Percentages higher than 19% tend to make the rubber too hard, and when the content is lower than 13% the degree of association in the crystalline styrene domains is marginal. Dexco Polymers, a Dow Chemical/Exxon Chemical Partnership, makes a styrenic block copolymer rubber, VECTOR 4114-D, that meets the criteria established for the rubber in the non-depositing duct tape adhesive.

The rubber in the adhesive is tackified with an aromatic C-5 resin having a Ring & Ball Softening Point of 91–100 C., and a Mw Molecular Weight of 1400–2000. C5 resins are aliphatic resins produced from light, so-called C-5 petroleum fractions. The principal monomers are cis- and trans-piperylene. Also found in these streams are isoprene, 2-methylbutene-2, and in some cases dicyclopentadiene. The aromatic portion is minor, only accounting for about 7% or less of the aromatic C-5. Hercules' RES M-1148 and Hercules' RES M-1149 have been found to yield, at loading levels greater than 65 per 100 parts of rubber, adhesives having excellent quick stick, peel adhesion and shear adhesion (even at temperatures in excess of 66 C. (150 F.)), however, with rather poor ball tack. Ball tack is a good indication of wetting. Typically duct tape has a ball tack of less than 2 cm. Hercules' RES M-1148, which has a Ring & Ball Softening Point of 96 C., a Mw Molecular Weight of 1500, an acid number less than 1, and a relatively light color, having a Gardner number of 3, did not have satisfactory ball tack in a trial adhesive formulation that had no plasticizing oils, even though quick stick values, as already mentioned, were very high. The ball tack was in excess of 9 cm. This resin demonstrated excellent thermal stability, having unchanged viscosity over 96 hours at 177 C. (350 F.) exposed in an open quart can in a forced air oven.

The ball tack is improved to a level comparable to a calendered duct tape adhesive through the addition of an oil, preferably a napthenic oil like Ergon HYPRENE L-2000, or Sunoco SUNTHENE 4240, wherein aromatics account for over 40 weight percent. At load levels of 20 parts per 100 rubber, the adhesive becomes sufficiently soft to yield ball tacks of 2 cm or less. The oil aids in processing in that it lowers the viscosity, and it lowers the overall cost of the adhesive. The oil should have a PNA (polynuclear aromatic) content under 0.1%, as PNA's are considered carcinogenic by OSHA.

The viscosity of the hot melt adhesive is further lowered through the addition of an C-9 aromatic hydrocarbon resin having a Ring & Ball softening point above 125 C. (257 F.), which serves as an end-block reinforcing resin. These resins consists of aromatic petroleum resins and resins from coal tar, called commonly coumarone-indene resins. These resins are produced by the cationic solution polymerization of aromatic crude streams containing indene as the principal monomer along with varying minor percentages of styrene, methylstyrenes, and methylindenes. Coumarone and dicylcopentadiene may also be present. Petroleum based C-9's, such as Sunbelt SB-1400, are preferred over coal tar based resins, such as Neville LX-509, because they tend to be lighter and less odorous, although either will work. Sunbelt SB-1400 has a Ring & Ball softening point of 140 C. (284 F.). These resins are relatively inexpensive relative to the styrenic block copolymer rubber, and so their inclusion generally lowers the cost of the adhesive. Aromatic resins are added up to about 25 parts per hundred rubber.

The adhesive contains an antioxidant system that keeps degradation of the adhesive, and particularly the S-I-S rubber to a level wherein there is very little degradation during hot melt coating, nor in aging tests conducted using a variety of substrates and conditions. A typical hot melt adhesive, using Ciba Geigi's IRGANOX 1010, which is tetrakis [methylene(3,5-di-tert-butyl-4-hydroxyhydrocinnamate)] methane, at 1.2% on the adhesive has a significant amount of degradation as determined by the drop in melt viscosity. Using a Brookfield hot melt viscometer, a typical adhesive formulated with this recommended antioxidant, when heated at 177 C. (350 F.) for 24 hours exposed to the atmosphere, had a 30% drop in viscosity. A drop in viscosity is indicative of significant chain scission. Empirically, we knew that 30% was a benchmark that was satisfactory for many adhesives, as the actual hot melt coating process is much less severe. Using this same measure of viscosity drop, we determined that significant less degradation could be achieved by incorporating a dithiocarbamate ultra rubber accelerator in combination with a hindered phenol. Further still, through the appropriate selection of a hindered phenol, the ultraviolet light stability can also be improved. The isocyanurate trimer of a hindered phenol, Tris (3,5-di-tert-butyl-4-hydroxy-benzyl) isocyanurate, is reputed to impart UV resistance as well as oxidative resistance, however it is generally only used in solvent coatings, because its melting point is so high, 217 C. (423 F.). This temperature is higher than temperatures attained in extrusion coatings of pressure sensitive adhesives. The preferred dithiocarbamate rubber accelerator is Zinc di-alkyldithiocarbamate, and within this group of compounds Zinc di-n-butyldithiocarbamate had the most consistent performance. A 1:1 ratio blend of the hindered phenol, Tris (3,5-di-tert-butyl-4-hydroxy-benzyl) isocyanurate, and the metal salt of dialkyldithiocarbamic acid, Zinc di-n-butyldithiocarbamate, was added at increasing levels up to 2% on the adhesive, and tested for thermal stability as determined in the hot melt Brookfield viscometer. The effectiveness of the 1:1 blend leveled off in the 1.7% to 1.9% range, resulting in a viscosity drop of only 7%–10% after 24 hours at 177 C. (350 F.).

The antioxidant system is augmented with a filler, which is a metal salt of carbonic acid, which in addition to lowering the cost, the salt, specifically calcium carbonate, acts as a buffer against possible acid catalyzed degradation. Typically the calcium carbonate is added on the order of 2% to 6% total adhesive.

The adhesive is made using a multiport screw extruder having a heated barrel into which are metered the styrenic block copolymer rubber, then the antioxidant blend, third-the aromatic C-5 resin, fourth-the C-9 resin, and, in the last port, a dispersion of filler in naphthenic oil. The exit temperature of the extruder barrel is 177 C. (350 F.), and the viscosity of the adhesive is 37,000 cps as measured using spindle No: 29 at 5 rpm. The inlet ports are purged with an inert gas, nitrogen, to reduce oxidation. If the adhesive is to be coated in the immediate future, the molten adhesive is pumped to a surge/agitated tank which is also purged with carbon dioxide. To coat, the adhesive is applied as a molten material, continuously extruded through a die, onto a web of cloth backing, which is continuously traversing over a supporting nipping backup roller which is in line with the die. The die is a longitudinal slot that is deckled to a width that is just slightly narrower than the width of the backing. The coating profile is established by controlling the mass weight flow rate of the molten adhesive with respect to the speed of the web of a given width, such that for a given web speed there is delivered an appropriate flow of adhesive through the breadth of the die, which results in a filmic mass weight of adhesive being coated onto the cloth backing side of the duct tape backing. Generally speaking, the die is heated to a temperature that is about the same temperature as the adhesive exiting the extruder.

The non-depositing adhesive is envisaged to be particularly well suited for duct tape products that are going to be used to form temporary attachments, such as a gaffer's tape, or a band technician's stage tape, or a hunter's camouflage tape, or a sail maker's positioning silver duct tape.

EXAMPLE 1

Gaffer's Tape is comprised of a pressure sensitive adhesive coated onto a backing of colored cloth backing that is impregnated with a pigmented pvc coating. The cloth has a thread count of 62 tpi in the warp and 41 tpi in the fill, with a tensile of 44 lbs (195 N). The thickness of the cloth is 9 mils (0.23 mm). The finish on the surface of the tape has low reflectivity, and is usually a flat black. Other colors can be used. The opposing side of tape has a continuous non-bubbled coating of a non-depositing pressure sensitive adhesive which is bonded to the cloth backing and cannot be made to transfer or pick off the backing, even when the adhesive surface is stuck face to face. The formula for the adhesive is given in Table 1. The hot melt extrusion coating process applies 8 g/sq ft (86.1 g/sq m), bringing the total weight to 22 g/sq ft (236 g/sq/m), which increases the thickness to 11 mils (0.28 mm). The finished tape has a target 180° Peel to steel of 75 oz/in (681 N/m), a 90° Peel adhesion of 60 oz/in (545 N/m), Quick Stick to steel of 45 oz/in (409 N/m), Rolling ball tack 1.5 cm (0.6 in), and a Static shear (12.5 mm × 12.5 mm @ 500 g load) typically in excess of 24 hours, with an 8 hour minimum. Note in the fourth column of Table 1 is a suggested metering rate for the extruder to maintain a supply of adhesive to coat a 57 inch (145 cm) web at 275 ft/min (84 m/min). In actual practice the extruder is slaved to the line.

EXAMPLE 2

Stage Tape is comprised of a pressure sensitive adhesive coated onto a backing of a bright yellow colored low density polyethylene film laminated to an open weave polyester-cotton scrim. Other colors can be used. In the present example, the film is 1.6 mils (0.04 mm) thick, and it is laminated to a 32×20 thread count scrim with a clear extruded coating of polyethylene resin. The polyethylene-scrim laminate has a tensile of 40 lbs (177N). The thickness of the laminate is 9 mils (0.23 mm). The opposing side of tape has a continuous non-bubbled coating of a non-depositing pressure sensitive adhesive which is bonded to the scrim and cannot be made to transfer or pick off the backing, even when the adhesive surface is stuck face to face. The formula for the adhesive is given in Table 1. The hot melt extrusion coating process applies 9 g/sq ft (96.9 g/sq m), bringing the total weight to 22.5 g/sq ft (241 g/sq/m), which increases the thickness to 10 mils (0.25 mm). The finished tape has a target 180° Peel to steel of 131 oz/in (1189 N/m), a 90° Peel adhesion of 96 oz/in (872 N/m), Quick Stick to steel of 65 oz/in (591 N/m), Rolling ball tack 1.5 cm (0.6 in), and a Static shear (12.5 mm × 12.5 mm @ 500 g load) typically in excess of 24 hours, with an 12 hour minimum. Note higher peel adhesions and shear are obtained in Example 2 than in Example 1, because the open weave scrim acts to reinforce the adhesive in the stage tape. The coating process is the same as in Example 1.

TABLE 1

| INGREDIENT | PARTS % | PHR | 1000 LBS/HR |
|---|---|---|---|
| SIS Rubber @ 42% Diblock (Vector 4114-D) | 42.26 | 100.0 | 594.4 |
| Aromatic C-5 resin (Hercotac 1148) | 34.86 | 83.5 | 453.2 |
| Aromatic C-9 resin (SB-1400) | 7.93 | 18.8 | 96.1 |
| Calcium Carbonate | 4.08 | 9.7 | 53.0 |
| Napthenic Oil (Hyprene L-2000) | 9.51 | 22.5 | 123.6 |
| Zinc di-n-butyldithiocarbamate | 0.95 | 2.2 | 12.4 |
| Tris(3,5-di-butyl-4-hydroxy-benzyl)isocyanurate | 0.95 | 2.2 | 12.4 |

EXAMPLE 3

Camouflage Tape is comprised of a pressure sensitive adhesive coated onto a backing of a green-brown-yellow colored low density polyethylene film laminated to an open weave polyester-cotton scrim. Other colors can be used. In the present example, the film is 1.6 mils (0.04 mm) thick, and it is laminated to a 32×20 thread count scrim with a clear extruded coating of polyethylene resin. The polyethylene-scrim laminate has a tensile of 40 lbs (177N). The thickness of the laminate is 9 mils (0.23 mm). The opposing side of tape has a continuous non-bubbled coating of a non-depositing pressure sensitive adhesive which is bonded to the scrim and cannot be made to transfer or pick off the backing, even when the adhesive surface is stuck face to face. The formula for the adhesive is given in Table 2. The hot melt extrusion coating process applies 9 g/sq ft (96.9 g/sq m), bringing the total weight to 22.5 g/sq ft (241 g/sq/m), which increases the thickness to 10 mils (0.25 mm). The finished tape has a target 180° Peel to steel of 131 oz/in (1189 N/m), a 90° Peel adhesion of 96 oz/in (872 N/m), Quick Stick to steel of 65 oz/in (591 N/m), Rolling ball tack 1.5 cm (0.6 in), and a Static shear (12.5 mm × 12.5 mm @ 500 g load) typically in excess of 24 hours, with an 12 hour minimum. The coating process is the same as given in Example 1.

EXAMPLE 4

Sailmaker's Silver Duct Tape is comprised of a pressure sensitive adhesive coated onto a backing of a silver colored polyethylene film laminated to an open weave polyester-cotton scrim. Other colors can be used. In the present example, the film is 1.6 mils (0.04 mm) thick, and it is laminated to a 28×20 thread count scrim with a clear extruded coating of polyethylene resin. The polyethylene-scrim laminate has a tensile of 35 lbs (155N). The thickness of the laminate is 9 mils (0.23 mm). The opposing side of tape has a continuous non-bubbled coating of a non-depositing pressure sensitive adhesive which is bonded to the scrim and cannot be made to transfer or pick off the backing, even when the adhesive surface is stuck face to face. The formula for the adhesive is given in Table 2. The hot melt extrusion coating process applies 9 g/sq ft (96.9 g/sq m), bringing the total weight to 22 g/sq/m), which increases the thickness to 10 mils (0.25 mm). The finished tape has a target 180° Peel to steel of 130 oz/in (1150 N/m), a 90° Peel adhesion of 94 oz/in (853 N/m), Quick Stick to steel of 63 oz/in (573 N/m), Rolling ball tack 2.0 cm (0.8 in), and a Static shear (12.5 mm × 12.5 mm @ 500 g load) typically in excess of 24 hours, with an 8 hour minimum. The coating process is the same as given in Example 1.

TABLE 2

| INGREDIENT | PARTS % | PHR | 1000 LBS/HR |
|---|---|---|---|
| SIS Rubber @ 40% Diblock (KRATON D-1117) | 42.26 | 100.0 | 549.4 |
| Aromatic C-5 resin (Hercotac 1148) | 34.86 | 83.5 | 453.2 |
| Aromatic C-9 resin (SB-1400) | 7.93 | 18.8 | 96.1 |
| Calcium Carbonate | 4.08 | 9.7 | 53.0 |
| Napthenic Oil (Sunthene 4240) | 9.51 | 22.5 | 123.6 |
| Zinc di-n-butyldithiocarbamate | 0.95 | 2.2 | 12.4 |
| Tris(3,5-di-butyl-4-hydroxy-benzyl)isocyanurate | 0.95 | 2.2 | 12.4 |

I claim:

1. A duct tape having a non-depositing pressure sensitive adhesive, where duct tape is a generic term for cloth backed tapes which usually are laminated to a film or coated with a polymeric coating, wherein said duct tape can be removed after application to a surface of a substrate, the duration of the application being indefinitely extended for at least two weeks, without leaving an adhesive residue on the surface of the substrate, where said duct tape consists of the following:

(1). a backing that is constructed largely of a cloth based colored material having a minimum tensile of 25 pounds;
   (2). a continuous non-bubbled coating of a non-depositing pressure sensitive adhesive that is integrally bonded to the backing, wherein the non-depositing pressure sensitive adhesive is comprised of:
      a. 100 parts of a styrenic block copolymer rubber of styrene and isoprene, wherein the styrene content is 13-19%, wherein said styrenic block copolymer rubber is a mixture of a diblock and a triblock, where the diblock content is not less than 30%, and wherein said styrenic block copolymer rubber has a melt flow index of 19 or higher;
      b. 100 parts per hundred rubber or less of an aromatic C-5 resin having a Ring and Ball Softening Point above 91° C., and a Mw molecular weight of 1400-2000;
      c. 25 parts per hundred rubber or less of an aromatic C-9 resin having a Ring and Ball Softening Point above 125° C.;
      d. 25 parts per hundred rubber or less of a napthenic oil with an aromatic component of the oil that accounts for over 40 weight percent;
      e. 2 to 5 parts per hundred rubber of the metal salt of a dialkyldithiocarbamate;
      f. 2 to 5 parts per hundred rubber of an isocyanurate trimer of a hindered phenol;
      g. 15 parts per hundred rubber or less of a filler, comprising of a metal salt of carbonic acid.

2. The duct tape as claimed in claim 1 wherein said styrenic block copolymer rubber is comprised of 39%–43% diblock and has an overall styrene content of 14% to 17%.

3. The duct tape as claimed in claim 1 wherein said aromatic C-5 resin has a Ring and Ball Softening Point of 94°–97° C., a Mw Molecular Weight of 1450 to 1550, and said aromatic C-5 resin is present in the non-depositing pressure sensitive adhesive at 80 to 85 parts per hundred rubber.

4. The duct tape as claimed in claim 1 wherein said aromatic C-9 resin has a Ring and Ball Softening Point of 138°–142° C., and said aromatic C-9 resin is present in the non-depositing pressure sensitive adhesive at 17 to 20 parts per hundred rubber.

5. The duct tape as claimed in claim 1 wherein said napthenic oil is present in the non-depositing pressure sensitive adhesive at 21 to 23 parts per hundred rubber.

6. The duct tape as claimed in claim 1 wherein said metal salt of carbonic acid is a calcium carbonate, and the calcium carbonate is present in the non-depositing pressure sensitive adhesive at 8 to 10 parts per hundred rubber.

7. The duct tape as claimed in claim 1, wherein the backing is a colored polyethylene film adhesively laminated to an open weave scrim with a polyethylene resin.

8. The duct tape as claimed in claim 7, wherein the non-depositing pressure sensitive adhesive is coated at 9 g/sq ft (97 g/sq m) resulting in a tape having a 180 Peel to Steel of 131 oz/in (1189 N/m), Quick Stick to Steel of 65 oz/in (591 N/m), and a Static shear (12.5 mm × 12.5 mm) @500 g load) typically in excess of 24 hours.

* * * * *